(12) United States Patent
Hagendorf (10) Patent No.: US 10,488,835 B2
(45) Date of Patent: Nov. 26, 2019

(54) METHOD FOR CONFIGURING A TESTER EQUIPPED FOR TESTING AN ELECTRONIC CONTROL UNIT

(71) Applicant: dSPACE digital signal processing and control engineering GmbH, Paderborn (DE)

(72) Inventor: Joerg Hagendorf, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 255 days.

(21) Appl. No.: 15/220,433

(22) Filed: Jul. 27, 2016

(65) Prior Publication Data

US 2017/0315521 A1 Nov. 2, 2017

(30) Foreign Application Priority Data

Apr. 27, 2016 (DE) .......................... 10 2016 107 797

(51) Int. Cl.
*G05B 17/02* (2006.01)
(52) U.S. Cl.
CPC ................................. *G05B 17/02* (2013.01)
(58) Field of Classification Search
CPC ..................................................... G05B 17/02
See application file for complete search history.

(56) References Cited

U.S. PATENT DOCUMENTS 5,111,413 A * 5/1992 Lazansky ............ G06F 17/5022
703/13
6,950,946 B1 * 9/2005 Droz ....................... G06F 21/88
340/5.74

(Continued)

FOREIGN PATENT DOCUMENTS

| DE | 103 47 891 A1 | 5/2005 |
| DE | 10 2011 012 187 A1 | 8/2012 |
| DE | 10 2015 113 739 A1 | 3/2016 |
| EP | 2 770 389 A2 | 8/2014 |

OTHER PUBLICATIONS

German Search Report for German Application No. 102016107797.6 dated Dec. 22, 2016 with English translation.

(Continued)

*Primary Examiner* — Kenneth M Lo
*Assistant Examiner* — Mohammad A Rahman
(74) *Attorney, Agent, or Firm* — Muncy, Geissler, Olds & Lowe, P.C.

(57) ABSTRACT

A method for configuring a tester equipped for testing an electronic control unit, wherein a software model of a technical system is executed on the tester and communicates electronically through an input/output interface of the tester with a device connected to the tester. A configuration system is coupled to a modeling system, and a software model characterized by function blocks that are connected to one another is present in the modeling system. The tester is configured in the configuration system by interconnected configuration elements such that physical characteristics of the input/output interface and/or the connection of the input/output interface with the software model are defined via the configuration elements. The configuration system is coupled to the modeling system such that the software model is provided to the configuration system via a coupling interface at the run time of the modeling system.

17 Claims, 5 Drawing Sheets

(56) References Cited

U.S. PATENT DOCUMENTS

| | | | |
|---|---|---|---|
| 8,762,415 B2* | 6/2014 | Catahan, Jr. ........... | G06Q 30/06 |
| | | | 705/20 |
| 9,043,084 B2 | 5/2015 | Vosseler | |
| 2008/0272803 A1* | 11/2008 | Balasubramanian .. | G01K 7/015 |
| | | | 326/38 |
| 2009/0224793 A1* | 9/2009 | Kemmerling ............. | G06F 8/30 |
| | | | 324/750.15 |
| 2012/0266159 A1* | 10/2012 | Risbood .............. | G06F 9/44505 |
| | | | 717/177 |
| 2013/0007709 A1* | 1/2013 | Fan .......................... | G06F 8/71 |
| | | | 717/121 |
| 2014/0244231 A1* | 8/2014 | Paule ................. | G05B 23/0208 |
| | | | 703/13 |
| 2016/0062861 A1* | 3/2016 | Tegethoff .............. | G06F 11/221 |
| | | | 714/28 |
| 2017/0169623 A1* | 6/2017 | Chen ................... | G06F 17/5009 |

OTHER PUBLICATIONS

German Office Action for German Application No. 102016107797.6 dated Dec. 23, 2016 with English translation.

\* cited by examiner

METHOD FOR CONFIGURING A TESTER EQUIPPED FOR TESTING AN ELECTRONIC CONTROL UNIT

This nonprovisional application claims priority under 35 U.S.C. § 119(a) to German Patent Application No. 10 2016 107 797.6, which was filed in Germany on Apr. 27, 2016, and which is herein incorporated by reference.

BACKGROUND OF THE INVENTION

Field of the Invention

The present invention relates to the development of control units, such as are used in the automotive industry or in the aviation industry, for example, for controlling technical systems such as, e.g., engines or brakes. In particular, the present invention relates to testers that are used in the development process for the control unit.

Description of the Background Art

The development of control units has become a highly complex process. New control units and new control functions should thus be tested as early in the development process as possible in order to verify general functionality and to set the direction for further development. Towards the end of the development process, it is important to test the control unit, which has already undergone extensive development, as comprehensively as possible in order to make necessary modifications based on the test results before the control unit comes into use or enters mass production, so that it functions as desired under all conditions in later operation.

The methods of hardware-in-the-loop simulation (HIL simulation) and rapid control prototyping (RCP) are known for testing control units. In HIL simulation, an electronic control unit is connected to a tester (HIL simulator) on which a software model is executed, for example of the system to be controlled or regulated by the control unit. The software model is also referred to as an environment model. With it, the tester simulates for the control unit the physical environment of its future application. In RCP, in contrast, a software model of a control unit under development or undergoing improvement is executed on the tester. With the aid of the tester in the case of RCP, then, a technical system externally connected to the tester is regulated or controlled by means of the model executed on the tester.

Testing of a (mass produced) control unit employed in the end product is the final point of multiple preceding development steps of a regulation or control to be implemented on the control unit, wherein these development steps usually are described with the so-called V-model or else Z-cycle. Controller development, which is essential for functionality of many technical systems, starts off with the mathematical modeling of the control algorithm on a computer with a mathematical and graphical modeling environment, wherein the controller should be considered a part of the control unit. In addition, the environment of the control unit is also modeled mathematically, since the interaction of the controller on the control unit with the process to be controlled is of interest. In these functional mathematical considerations, simulation in real time generally is not necessary (offline simulation).

In the next step, using rapid control prototyping, the control algorithm devised previously is transferred to a powerful hardware unit, usually a hardware unit that is real-time-capable, which is connected to the actual physical process by suitable I/O interfaces, which is to say to a motor vehicle engine, for instance. Generally speaking, this real-time-capable hardware unit has nothing to do with the mass produced control unit that will later be employed; at issue here is proof of the basic functionality in practice of the previously devised control.

In another step, as part of automatic production code generation, the control that is likely to actually be employed later in the mass produced control unit is implemented on the target processor. Accordingly, in this step, the target hardware approximates the mass produced control unit, but is not identical to the mass produced control unit.

In another step, the mass produced control unit—which normally does not exist until a later development stage—is tested in the framework of a hardware-in-the-loop (HIL) test. The (mass produced) control unit physically present in this step is connected by means of its physical control unit interface to a powerful simulation computer here, often simply referred to as a simulator or tester. The simulator simulates the required variables of the real control unit under test, and exchanges input and output variables with the control unit. The pins of the physical control unit interface of the control unit are connected to the simulator by a cable harness. In this way, it is possible to simulate all required variables, for example of a motor vehicle engine—if applicable the entire motor vehicle with engine, drive train, chassis, and driving route—in the simulation environment, and to test the behavior of the control unit in interaction with the simulation environment in a risk-free manner.

For configuring testers such as, e.g., HIL or RCP systems, oftentimes configuration systems are used that can also contain configuration diagrams, for example. As a result of configuration, the tester is set up such that software models of technical systems can be executed on the tester and communicate electronically through the input/output interface of the tester with devices (systems under test) connected to the tester. The software models are created in dedicated modeling environments that are tailored specifically to the requirements of the modeling.

The known configuration systems and configuration diagrams have the disadvantage that configuring the characteristics of the tester in certain application scenarios is time-consuming and complicated.

In particular, it is a disadvantage that the modeling environments and configuration systems represent separate systems that cannot easily be connected to one another.

SUMMARY OF THE INVENTION

It is therefore an object of the invention is therefore to further develop the process of configuring HIL and RCP simulations, and in particular to simplify the process, make it more flexible, and speed it up.

In an exemplary embodiment, a method is provided for configuring, by means of a configuration system, a tester equipped for testing an electronic control unit, wherein a software model of a technical system is executed on the tester and the software model communicates electronically through an input/output interface of the tester with a system under test that is connected to the tester, wherein the configuration system is coupled to a modeling system, and a software model having function blocks that are connected to one another is present in the modeling system, and the tester is configured in the configuration system by interconnected configuration elements in such a manner that the physical characteristics of the input/output interface and/or the connection of the input/output interface with the software model are defined by means of the configuration elements, wherein the configuration system is coupled to the modeling system in such a manner that the software model is provided to the configuration system by means of a coupling interface at the run time of the modeling system.

This method has the advantage that the provision of the software model can take place in an automated manner, and need not take place through manual entry of designations and data paths of the software model. Providing the software model through the coupling interface allows faster and more flexible access to the software model, with the result that configuration of the tester takes place faster and more easily. Another advantage of the method according to the invention resides in the fact that it can lead to a reduced memory requirement and faster storage.

The tester serves to test the electronic control unit. The configuration system serves to configure the tester. The electronic control unit has electrical inputs and outputs, and is connected to the tester in order to be able to exchange data and/or signals, which is to say to communicate. Communication can take place over cables or wireless network connections, for instance.

Function blocks can primarily be functional components of graphical programs or configuration diagrams. However, a function block can also be a section of a source code in a high-level programming language such as, e.g., C++ or a machine language such as, e.g., assembler.

The coupling interface serves to transmit data between the modeling environment and the configuration system, for example, in the direction from the modeling system to the configuration system. Provision of the model can thus take place in this way. Through the configuration system, the software model can then be transmitted to the tester and stored by means of the configuration system. The transmitted data include, for example, the software model in itself or specific characteristics of the software model such as, e.g., its memory location, its designation, its execution rate, its size, and the like.

The system or device under test connected to the tester ("system under test" or also "device under test") can be an electronic control unit, for example. However, it can also be a sensor or a device to be controlled such as, e.g., a motor or any other desired electronically controlled part of a complex system such as, for instance, a motor vehicle or an aircraft.

In an embodiment of the method, an automatic transmission of a memory location and/or of an identifier of the software model takes place from the modeling system to the configuration system by means of the coupling interface.

According to an embodiment, the modeling system and the configuration system can be executed in separate process spaces. The method according to the invention is especially advantageous in this case, since no simple possibility has hitherto existed for coupling a modeling system and a configuration system together when they are executed in different process spaces, because independent processes or programs are involved. Execution in separate process spaces is normally associated with the relevant processes being executed in independent memory areas that processes executed outside of the relevant process space have no ability to access. Consequently, data cannot easily be exchanged between the configuration system and the modeling environment if no coupling interface is present.

An embodiment provides that the provision of the software model can be initiated from the modeling system or the configuration system. According to the invention, initiation of provision can take place from within the modeling system or the configuration system. This produces the advantage of a faster configuration process.

In an embodiment of the method, the initiation from the modeling system can cause a new instance of the configuration system to be stored or an already existing instance to be selected, in which instance the software model is provided. This results in the advantage of an increased degree of automation of the configuration.

An embodiment of the method provides that the provision can include an analysis of the software model, and the characteristics of the input/output interface and/or the connection of the input/output interface to the software model are configured at least partially automatically by means of the analysis. The analysis can ascertain, for example, the data types or value ranges of the signals used in the model or also clock rates of the model execution, with which the tester is configured accordingly.

In an embodiment of the method, the configuration elements can be data structures or program functions for storing input/output functionalities of the input/output interfaces of the tester.

In an embodiment of the method, the tester can be a hardware-in-the-loop simulator or a rapid control prototyping device.

In an embodiment of the method, provision is made that the configuration system includes an expansion mechanism.

By means of an expansion mechanism, hierarchically sorted characteristics on different levels can be automatically loaded into a memory or unloaded, which is expressed in a graphical configuration environment by an expanding and collapsing of different levels in a hierarchical tree structure, resulting in faster access to the characteristics of the tester.

The tester can be configured in the method by compiling program code generated with the configuration environment, taking into account the characteristics of the configuration elements and of the software model provided.

In an embodiment of the method, provision is made that the configuration elements can have ports, and connections between ports of two different configuration elements are automatically assigned to permit electronic communication. This is advantageous when said automatic assignment is connected with the provision of the software model.

In an embodiment of the method, provision is made that the characteristics can be transmitted to the tester and stored on the tester.

The invention additionally relates to a tester and an external computing device connected therewith, such as, e.g., a computer, a tablet, or a mobile communication device, wherein the tester is equipped for testing a control unit, wherein a software model of a technical system is executed on the tester and the software model communicates through an input/output interface of the tester with a device connected to the tester, and wherein the external computing device is equipped to carry out one of the methods described above. The computing device can execute the configuration system here.

The invention also relates to a computer program product and computer program for carrying out a method for configuring a tester equipped for testing an electronic control unit that is designed such that one of the methods described above is carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
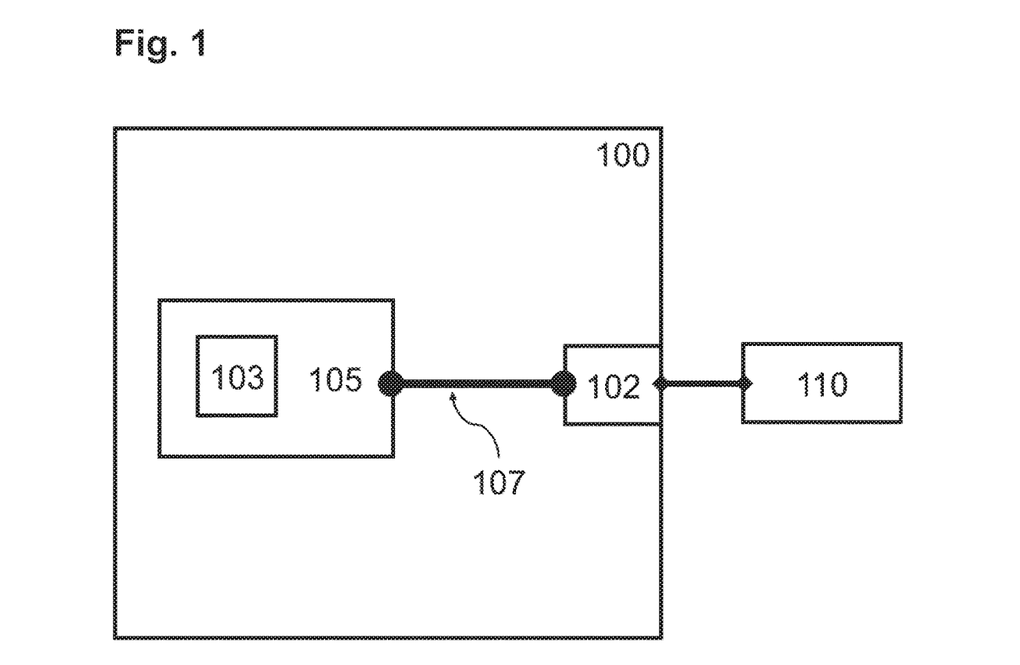
FIG. 1 shows a schematic representation of a tester.

In FIG. 1, a tester 100 is shown on which a software model 103 of a technical system is executed on a computing unit 105, wherein the software model or the computing unit communicates with a device 110 connected to the tester through an input/output interface 102 of the tester and an internal data connection 107. A computing unit can be a processor, an FPGA, or an embedded PC, for example. Communication with the tester can take place through the transmission of analog or digital electrical signals. The tester can include various hardware units (for example, plug-in cards) that make up the input/output interface 102. The input/output interface and the computing unit 105 constitute a cohesive system, but can also be spatially separated from one another and connected to each other by electronic connections.

The tester 100 can be, for example, a "hardware in the loop" (HIL) simulator. The tester 100 can also be a "rapid control prototyping" (RCP) system. However, the tester can also be a device that is suitable for performing HIL tests or RCP tests due to the fact that a model of a technical system can be executed on the tester, and this model can exchange data through input/output interfaces with a device under test that is connected to the tester, e.g., a control unit, with this data exchange being used to analyze, in particular, the reaction of the tester to data resulting from the model, which data are transmitted to the control unit in the form of electrical signals, for example.

A software model 103, which is to say, for example, a model of a technical system, can by way of example be present in the form of a software model that is specified by source code, for example in a high-level language such as C, C++, or in a machine language such as, e.g., assembler or executable machine code. Using a technical model, any desired systems can be modeled in order to virtually simulate them. Thus, for example, a model of a motor can be present as software, with the software being programmed such that during a simulation, which is to say here an execution of the model on a CPU or an FPGA, input parameters are processed by the software and output values are generated as a function of the input parameters and the nature of the model. An input parameter in this context can be, for instance, a voltage present at a throttle valve of a gasoline engine, and output values in this regard could be a resultant opening angle of the throttle valve, fuel consumption, and/or a resultant torque at the crankshaft. The model can also be a model of a control unit under test or under development, however. Generally speaking, the software model can be understood as an algorithm for control, regulation, or simulation of the behavior of a technical system.

Figure 2A:
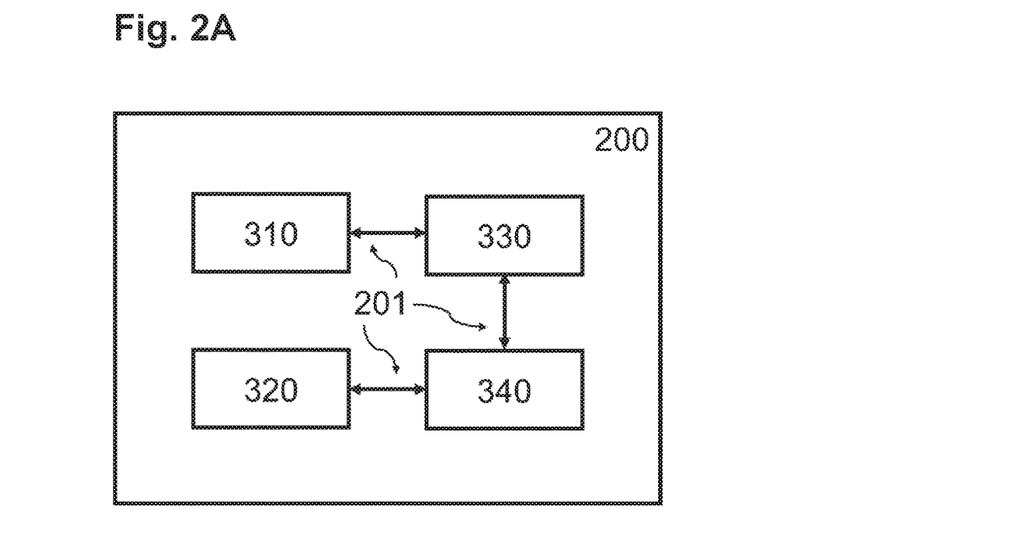
FIGS. 2A and 2B show two schematic representations of configuration systems.

FIG. 2A schematically depicts a configuration system 200 or configuration diagram that contains multiple configuration elements (310, 320, 330, 340), which can be connected by connecting lines 201 in order to configure the tester 100.

The configuration elements can be used to configure, e.g., characteristics and functionalities of the tester, in particular of the input/output interfaces and/or of the model interfaces or internal data connections 107. Examples of characteristics include, but are not limited to, interface types, voltage/current ranges, units, unit scalings, data types, duty cycles, frequencies and/or fault injections. These characteristics can be specified through parameters, for example through predefined selection options of multiple parameters or through an option to freely enter the parameters. These characteristics can be transmitted by means of the configuration system to the tester, where they can be stored and thus can result in a configuration of the tester corresponding to the characteristics. This configuration process can also take place indirectly, for example through code generation corresponding to the characteristics, and/or a subsequent compilation of the generated code, transmission of the code or of the compiled the code to the tester, and execution of the compiled code on the tester. Storage of the characteristics on the tester can thus also take place by means of a source code or binary code.

Physical characteristics of the tester, with associated parameters of the characteristics, can be assigned to the configuration elements, and the communication, which is to say in particular the functionality of the interface between the connected device (system under test) and the software model, can be configured by means of the parameters. In a graphical configuration environment, the individual configuration elements can also be connected to one another in order to thus carry out configuration of the tester. Using the connecting lines 201, different configuration elements can be connected to one another, or in other words associated or assigned. Through these assignments, it is possible to configure various hardware components of the tester, such as, e.g., processors, FPGAs, input/output boards, storage media, and the like to exchange data with one another, which is to say receive and send electrical signals.

Figure 2B:
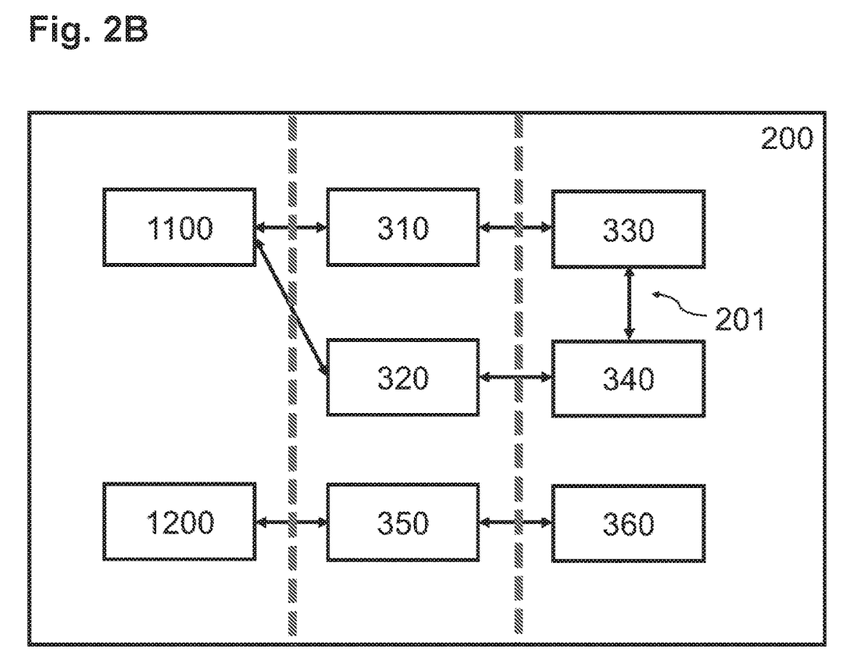

FIG. 2B shows a more specific form of a configuration system 200. Here, the configuration system is subdivided into 3 subunits or columns, which makes the configuration significantly more efficient and intuitive for a user. In the embodiment shown here, the devices connected to the tester 100 are configured with the configuration elements 1100 and 1200 in the left-hand column. The input/output interface of the tester is configured with the configuration elements 310, 320 and 350 specified in the center column. The characteristics of the models connected to the devices under test are configured with the configuration elements 330, 340 and 360 in the right-hand column. The configuration elements can be graphically connected to one or more other configuration elements in order to set the transmission paths of physical or logical signals.

A configuration system differs from a modeling environment in that the configuration system is specifically tailored to the requirements of configuring a tester. In particular, it is also possible therewith to create documentation of the tester, reuse configuration components or software models in different test scenarios, execute software models from different development/modeling environments on the tester, and optimize multi-core and multi-processor utilization.

Figure 3:
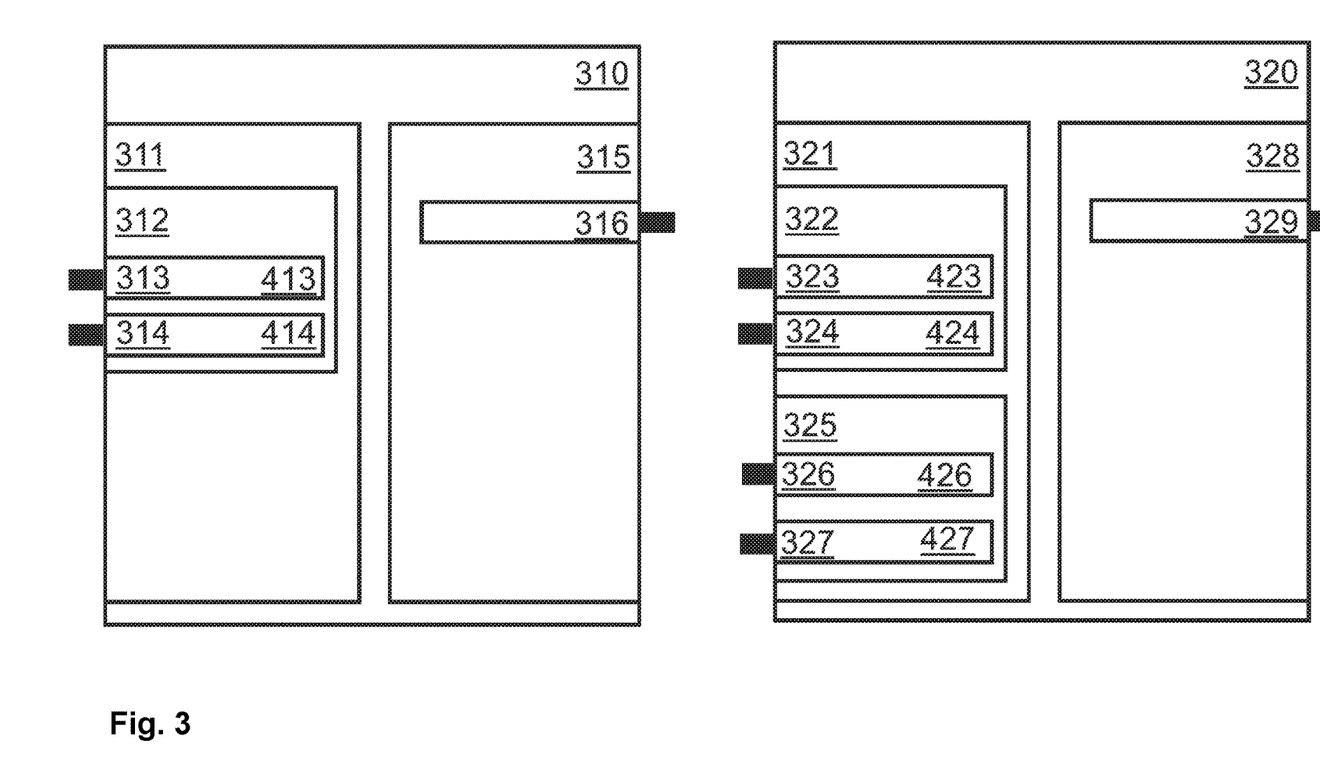
FIG. 3 shows a schematic representation of configuration elements.

In FIG. 3, special forms of the configuration elements 310 and 320 are shown in which the configuration elements have a hierarchical structure. The different hierarchical levels (311, 312, 313, 314, 315, 316) of the configuration element can in turn be regarded as configuration elements (311, 312, 313, 314, 315, 316). The configuration elements each have a specific element type. With respect to this invention, an element type or a role of an element is understood to mean a technical typification of an element. Examples of element types include input/output units, input/output channels, input/output cards, routers, potentials, slot pins, function ports, function blocks, signal conditioning, and/or logical signals. In the specific example in FIG. 3, the configuration element 310 at the highest hierarchy level can have, for example, the type "input/output function" or "I/O function," "function block," or the more specialized "voltage in/out," "current in/out," "analog/digital in/out" or "PWM in/out." The configuration elements 311 and 315 at the next lower hierarchy level can have, for example, the type "electrical interface" or "model interface." The configuration elements 312 at the next lower hierarchy level can have, for example, the type "logical signal." The configuration elements at the lowest hierarchy level can have, for example, the type "function port," "signal port," or "model port," and can also be referred to in general as ports. With a hierarchical structure of the configuration elements, it can also be the case that a characteristic is even additionally associated with the configuration elements that are hierarchically above and/or below the configuration element primarily associated with the particular characteristic.

Characteristics of the tester can be assigned to the configuration elements at all hierarchy levels. In the exemplary embodiment shown here, the characteristics 413 and 414 are assigned to the configuration elements 313 and 314. Since the configuration elements 313 and 314 are hierarchically below the configuration element 310, the characteristics 413 and 414 can likewise be assigned to the configuration element 310 and/or to the configuration elements located between the configuration elements 310 and 314.

Accordingly, in this exemplary embodiment the characteristics 423, 424, 426, and 427 are assigned to the configuration elements 323, 324, 326 and 327, which are hierarchically below the configuration element 320. Since the configuration elements 323, 324, 326, and 327 are hierarchically below the configuration element 320, the characteristics 423, 424, 246, and 427 can likewise be assigned to the configuration element 320 and/or can be assigned to the configuration elements located between the configuration elements 320 and 323, 324, 326 or 327.

The characteristics can be physically stored in the tester, for instance as data structures, file structures, function structures, program structures, variables, parameters, or the like.

The configuration elements at the lowest hierarchy level (e.g., 313 and 314) can also be referred to as ports. They can be connected to ports of other configuration elements in order to thus permit a data exchange or communication or signal exchange between the connected configuration elements or the hardware units associated therewith. This connection can also be accomplished automatically, taking into account the characteristics and/or roles.

A configuration element can also be, for example, a graphical element (block, UML node, etc.) in a graphical user interface such as, e.g., a configuration diagram. A configuration element can also be a smaller part of a larger graphical element in a graphical user interface.

Figure 4:
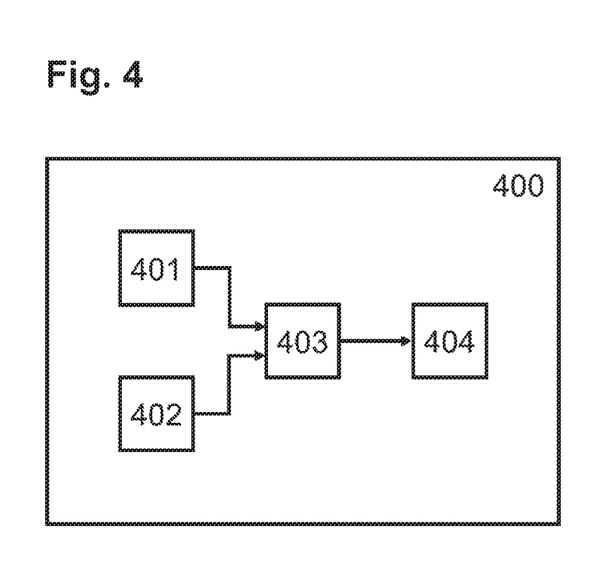
FIG. 4 shows a schematic representation of a modeling environment.

FIG. 4 shows an exemplary modeling environment 400 in which a (graphical) program or any desired algorithm is graphically modeled. In this example, program or model components and their functional relationships are configured through graphical elements, such as blocks and lines, for example. The graphical program 400 in FIG. 4 designed in the modeling environment can be constituted such that, for example, said graphical program reads in a first input value with the function block 401 and a second input value with the function block 402, then further processes the read data in accordance with the functionality specified in the block 403 in order to output, by means of the output block 404, an output value calculated by means of the graphical program. The functionality of the block 403 could include, for instance, in adding or multiplying the input values, in differentiating or integrating them, or the like. The graphical blocks can be connected to one another by connecting lines in order to thus establish a data exchange between blocks. Of course, a graphical program 400 is not limited to the embodiment shown here, but instead can be significantly more complex in nature, which can be reflected in the number of blocks and connections of the blocks. The graphical program 400 can be used for modeling a technical system. Consequently, a graphical program 400 can also be a model of a technical system 103 and/or 104. The programming of models of technical systems is frequently carried out with graphical programming languages, in which graphical blocks are connected to one another in a block diagram. A specific functionality is assigned to each graphical block in this context. These may be simple mathematical operations. On the other hand, the functionalities of graphical blocks can also be far more complex and represent complete program functions or programs. One example of such graphical programming languages or modeling environments is, e.g., Simulink from The Mathworks. Under certain circumstances, for instance when the function blocks are also suitable for configuration of a tester, the function blocks can also be referred to as configuration elements.

Figure 5:
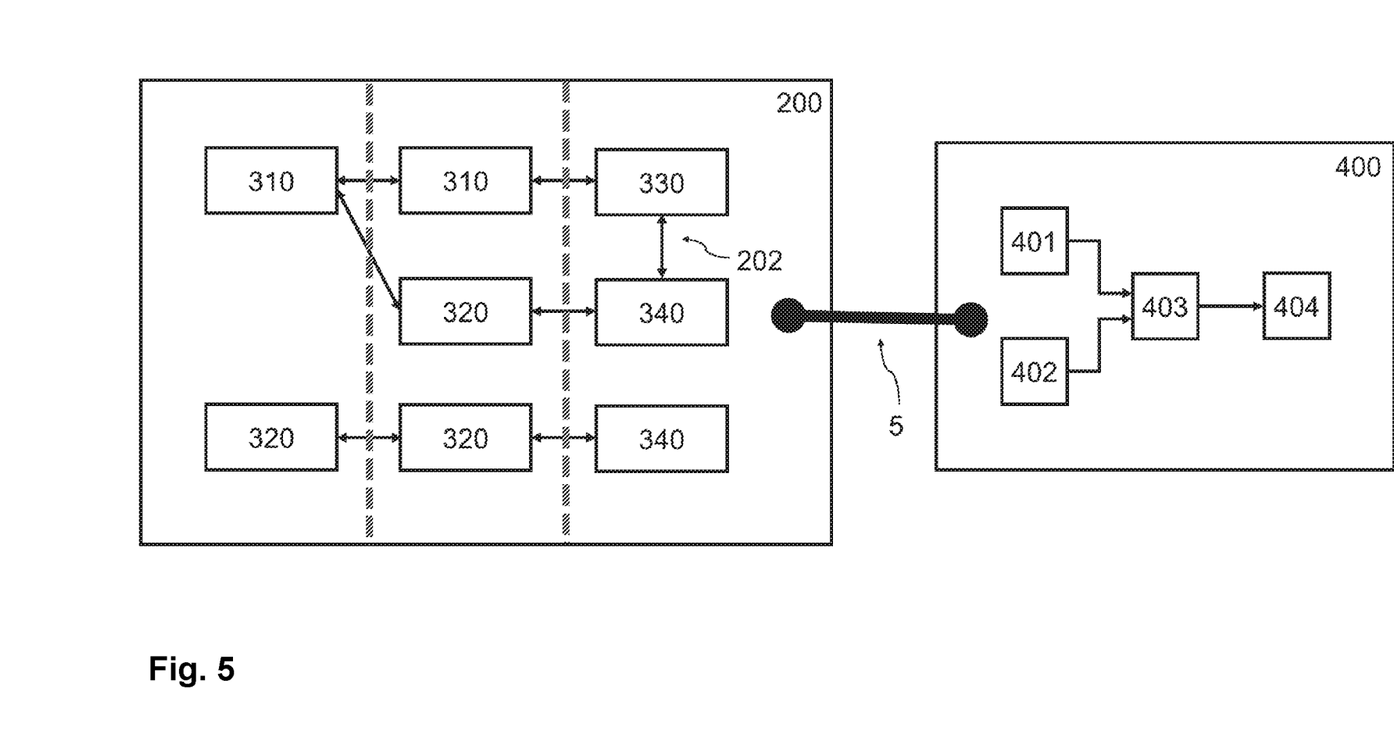
FIG. 5 shows a configuration system coupled to a modeling environment by means of a coupling interface.

FIG. 5 shows an exemplary form of a configuration system 200, which is connected to a modeling environment 400 through a coupling interface 5. Information about the software model is transmitted to the configuration environment through the coupling interface.

If the transmission is initiated from the configuration system, then the configuration system can detect by means of the coupling interface what software models currently are present in or are being processed in the modeling environment. One or more of these software models can be selected, for instance through a list display in the configuration system, in order to provide it to the configuration environment without the necessity of manually specifying a file path to the software model. In this context, the software model can also be analyzed, for example in order to ascertain its subsystem structure and/or the model port blocks or input/output interfaces of the software model, and to use them in the configuration system. Detection of the software models can take place through proprietary connection mechanisms or general automation interfaces. Through these, software commands can be issued with which open software models or file paths can be queried. The necessary commands can be encapsulated within the configuration system.

If the initiation of the transmission takes place from the modeling environment, then—if it is necessary—the configuration system can be started from the modeling environment. From an open software model, a user can initiate the addition of the software model to an existing instance of the configuration system or the creation of a new instance to which the software model is added. In order to facilitate this route, source code components that can be used to operate, e.g., automation interfaces of the configuration system, are inserted in the process space of the modeling environment. In this way, information such as the name and/or the file path or other characteristics of the software model can then be transmitted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for configuring, via a configuration system, a tester equipped for testing an electronic control unit connected to the tester through an input/output interface of the tester, the method comprising:
    executing a first software model of a technical system on the tester, the first software model communicating electronically with the electronic control unit through an input/output interface of the tester;
    coupling the configuration system to a modeling system, the modeling system having a second software model including configuration elements that are interconnected to one another, the configuration elements having a hierarchical structure, each configuration element having a specific element type; and
    configuring the tester via the configuration system by the interconnected configuration elements included in the second software model such that physical characteristics of the input/output interface of the tester and/or the connection of the input/output interface of the tester with the first software model are defined via the configuration elements,
    wherein the configuration system is coupled to the modeling system such that the second software model is provided to the configuration system via a coupling interface at a run time of the modeling system.

2. The method according to claim 1, wherein an automatic transmission of a memory location and/or of an identifier of the first software model takes place from the modeling system to the configuration system via the coupling interface.

3. The method according to claim 1, wherein the modeling system and the configuration system are executed in separate process spaces.

4. The method according to claim 1, wherein provision of the second software model is initiated from the modeling system or the configuration system.

5. The method according to claim 1, wherein initiation from the modeling system causes a new instance of the configuration system to be stored or an already existing instance to be selected, in which instance the second software model is provided.

6. The method according to claim 1, further comprising:
    analyzing the first software model; and
    configuring, at least partially automatically, the physical characteristics of the input/output interface and/or the connection of the input/output interface to the first software model.

7. The method according to claim 1, wherein the configuration elements are data structures or program functions for storing input/output functionalities of the input/output interfaces of the tester.

8. The method according to claim 1, wherein the tester is a hardware-in-the-loop simulator or a rapid control prototyping device.

9. The method according to claim 1, wherein the configuration system includes an expansion mechanism.

10. The method according to claim 1, wherein the tester is configured by code generation and/or compiling, taking into account characteristics of configuration elements and of the second software model.

11. The method according to claim 10, wherein the configuration elements have ports, and connections between ports of two different configuration elements are automatically assigned to permit electronic communication.

12. The method according to claim 1, wherein the physical characteristics of the input/output interface, and the model provided, are transmitted to the tester via the configuration system and stored on the tester.

13. A combination of a tester and an external computing device connected therewith, wherein the tester is equipped for testing a control unit, wherein the first software model of the technical system is executed on the tester and the first software model communicates through an input/output interface of the tester with a system under test that is connected to the tester, and wherein the external computing device is equipped to carry out the method according to claim 1.

14. The combination according to claim 13, wherein the computing device includes a computer, a tablet, or a mobile communication device.

15. A non-transitory computer readable medium storing a computer program product and computer program for carrying out a method for configuring a tester equipped for testing an electronic control unit according to claim 1.

16. The method according to claim 1, wherein the hierarchical structure includes an input/output function, an I/O function, a function block, voltage in/out, current in/out, analog/digital in/out, PWM in/out, an electrical interface and a model interface in different hierarchical levels.

17. The method according to claim 1, wherein the specific element type includes input/output units, input/output channels, input/output cards, routers, potentials, slot pins, function ports, function blocks, signal conditioning, and/or logical signals.

* * * * *